United States Patent [19]

Dilling et al.

[11] Patent Number: 4,740,591

[45] Date of Patent: Apr. 26, 1988

[54] LIGNIN BY-PRODUCTS OF PAPER-MAKING PROCESS

[75] Inventors: Peter Dilling, Isle of Palms; Mitchell S. Dimitri, Charleston, both of S.C.

[73] Assignee: Westvaco Corporation, New York, N.Y.

[21] Appl. No.: 37,772

[22] Filed: Apr. 13, 1987

[51] Int. Cl.$^4$ ................................................. C07G 1/00
[52] U.S. Cl. ..................................... 530/505; 530/500
[58] Field of Search ................................. 530/500, 505

[56] References Cited

U.S. PATENT DOCUMENTS

| | | | |
|---|---|---|---|
| 2,802,815 | 8/1957 | Doughty | 530/500 |
| 2,828,297 | 3/1958 | Giesen | 530/500 |
| 2,949,448 | 8/1960 | Töppel | 530/500 |
| 3,048,576 | 8/1962 | Ball et al. | 530/500 |
| 4,007,004 | 2/1977 | Bailey et al. | 530/500 X |

*Primary Examiner*—Earl Nielsen
*Attorney, Agent, or Firm*—Terry B. McDaniel; Richard L. Schmalz

[57] ABSTRACT

A method of producing a lignin by-product of the black liquor residue of a kraft pulping process having improved water-solubility in amine salt form wherein the lignin precipitate of the black liquor residue is water-wash purified and maintained at moderately acid pH of no lower than about 5. The lignin may then be combined in aqueous slurry with an organic amine, such as monoethanolamine, to provide a highly stable aqueous solution of the amine salt of the lignin. The water-soluble lignin salt is particularly suited for use as an additive in water-based pigment printing compositions. The lignin amine salt functions as a grinding agent for the pigment in formulating and as a binder for the pigment in the printing process.

10 Claims, 2 Drawing Sheets

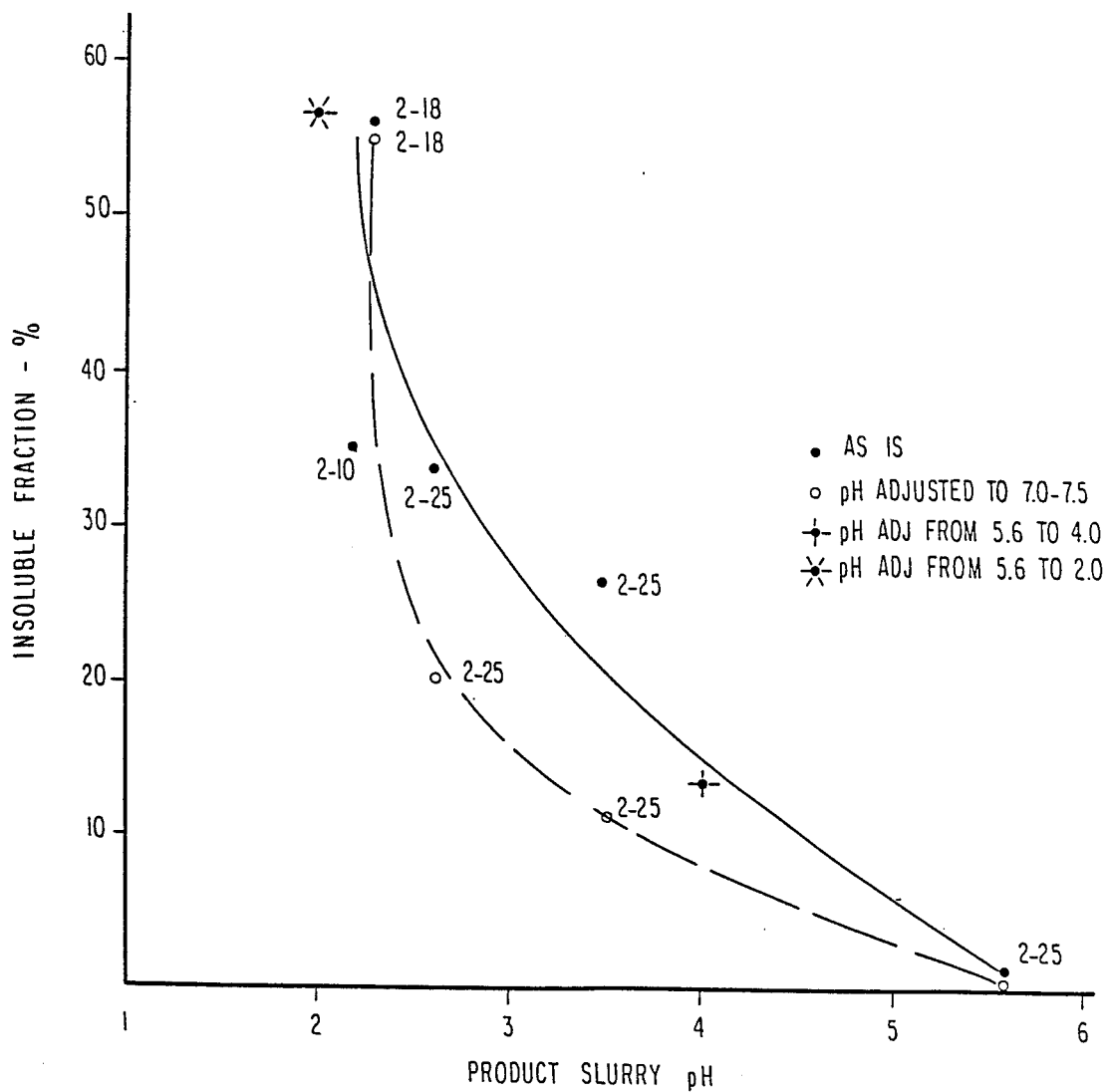

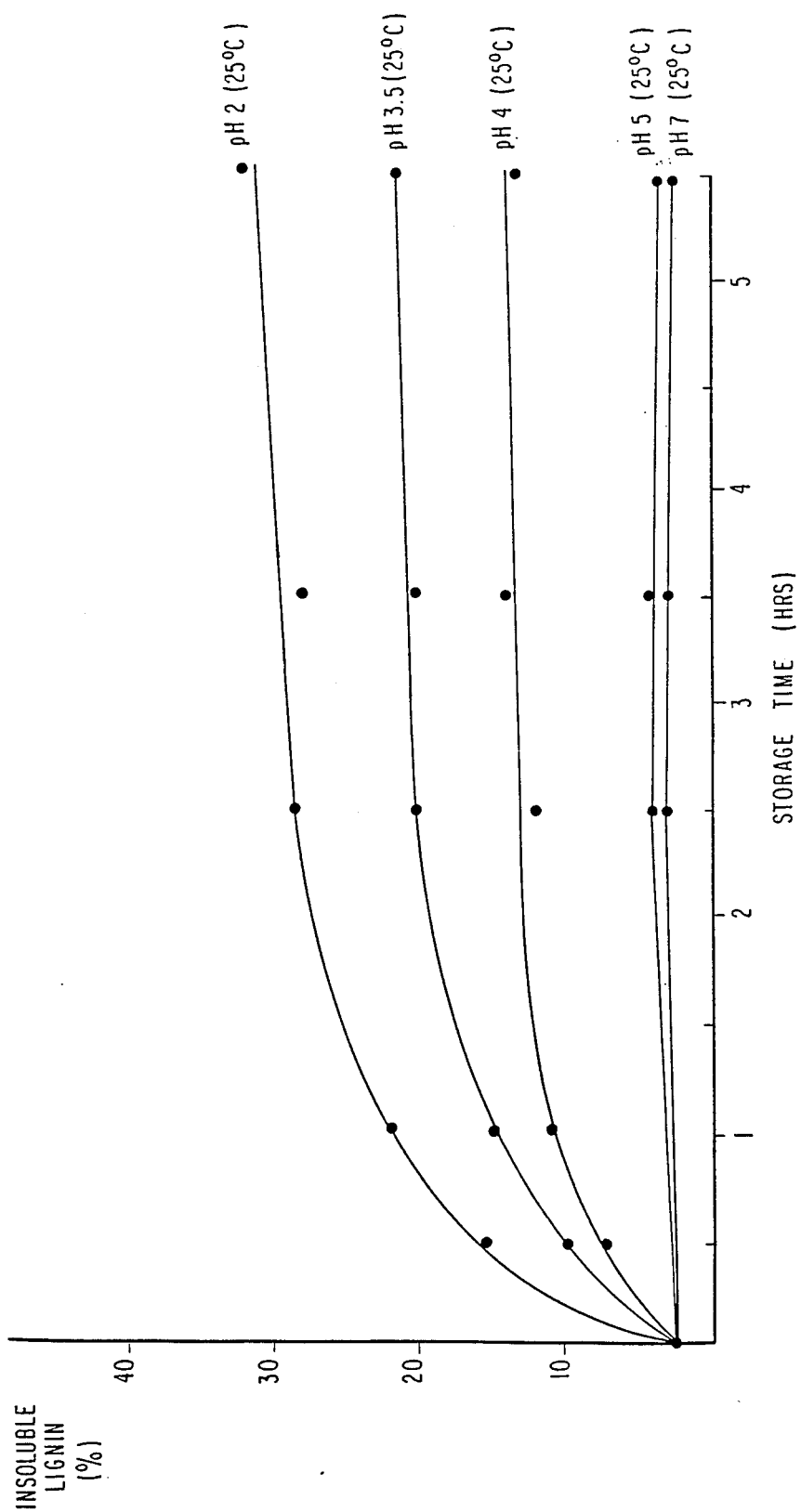

LIGNIN BY-PRODUCTS OF PAPER-MAKING PROCESS

The present invention is directed to a method of producing an improved lignin by-product of the black liquor residue of a kraft pulping process employed in paper making, and, more particularly, to a method of producing such a lignin by-product having improved water solubility in amine salt form for use as an additive in a water-based printing composition, and the products produced thereby.

BACKGROUND OF THE INVENTION

Lignin by-products of the black liquor residue of a kraft pulping process have been variously employed as additives in other chemical compositions. Sulfonated lignins are used as dispersants in textile dyestuff compositions and pigment printing pastes. Lignin by-products have also found use as grinding aids in oil well drilling operations, and as emulsifiers in other chemical compositions. Various methods of recovery, purification, and modification of lignin by-products as water-soluble sulfonated and sulfomethylated salts for use as additives in dyestuff compositions are described and disclosed in the following U.S. Pat. Nos. 2,525,433; Adler et al. 2,680,113; 2,690,973; Keirstead et al. 3,094,515; Baisdell 3,158,520; 3,503,762; Detroit 3,726,850; Hintz 3,769,272; Falkehag et al. 3,841,887; Dilling et al. 4,001,202; Dilling 4,131,564; Lin 4,184,845; Lin 4,308,203; and Dilling et al. 4,355,996.

Generally, the lignin material of a kraft pulping process employed in paper making is recovered from the black liquor by lowering the pH of the liquor with carbon dioxide from an initial pH of about 13 to a pH of around 9.5 to precipitate the lignin material from the black liquor. The pH of the precipitated lignin slurry which may be modified, as by sulfonation, if desired, is further lowered with sulfuric acid to a pH of about 1.5 to 3, at which point the solid lignin is washed with water to remove inorganic salts and impurities therefrom. The purified lignins are then employed as additives in specified chemical compositions.

In U.S. Pat. No. 4,470,876, Beaupre' et al. teach a process for the treatment of kraft black liquor which comprises acidifying the black liquor with sulfuric acid "where the pH of the mixture is maintained at most about 5, preferably below about 4.5" (col. 2, lines 30–31), prior to separation of the lignin therefrom.

Recent attempts have been made to use such purified lignin materials in water-based carbon black printing compositions both as a grinding aid and as an adhesive to bind the carbon black to the substrate in printing operations. To render the purified lignins water-soluble, an organic amine, such as monoethanolamine (MEA), must be added to an aqueous lignin slurry to form a water-soluble lignin amine salt for addition to the printing composition. However, this proposed use of lignins in such water-based printing compositions has been rendered impractical because the lignin exhibits poor solubility and poor stability in aqueous solution with MEA. In particular, it has been found that the poor water solubility of the amine lignin salts prepared as described results in sludging and viscosity variations with consequent reduced effectiveness of the formulated printing compositions.

BRIEF OBJECTS OF THE INVENTION

It is, therefore, an object of the present invention to provide an improved method of obtaining lignin by-products of a kraft pulping process having excellent water-solubility and stability in amine salt form for use in water-based printing systems.

It is a further object to provide an improved method of recovering lignin by-product materials from a kraft pulping process which can be rendered highly water-soluble with organic amines, in particular monoethanolamine, and may be maintained in highly stable solution for extended periods for subsequent use.

It is still another object to produce a lignin by-product of the black liquor residue of a kraft-pulping process having improved water-solubility in amine salt form.

BRIEF SUMMARY OF THE INVENTION

The lignin by-products of the present invention are recovered from the black liquor of a kraft pulping process by initial precipitation of the lignin from the black liquor, as by treatment with carbon dioxide, and by subsequent controlled water-wash purification of the precipitated lignin without subjecting them to highly acidic conditions for significant time periods, as in the prior art. Preferably, the precipitated lignins are water-wash purified at mild levels of acidity, preferably at pH levels above about 5. The purified lignins may then be substantially completely solubilized in aqueous medium by addition of an organic amine, such as monoethanolamine, to produce a highly stable, water-soluble salt for subsequent use as a grinding aid and binder in water-based carbon black printing systems.

By not subjecting the lignin to highly acidic conditions, i.e., to pH levels of about 5 or below during recovery from the black liquor and purification, the lignin by-product is substantially fully water-soluble in amine salt form. The lignin amine salts then can be employed in aqueous printing compositions without sludging or viscosity variations, as has herefore been experienced in the prior art.

BRIEF DESCRIPTION OF THE DRAWINGS

FIG. 1 of the drawing illustrates, in graph form, the water-solubility of amine salts of lignin by-products of the black liquor residue of a kraft pulping process in which lignins were wash-water purified to remove impurities at various pH levels.

FIG. 2 illustrates, in graph form, the effect of pH on lignin/MEA composition water-solubility at varying storage times for the compositions.

DETAILED DESCRIPTION OF THE INVENTION

As heretofore mentioned, lignin is obtained from spent pulping liquors, known as black liquor, of the paper-making industry where lignocellulosic materials, such as wood, straw, cornstalks, bagasse and the like are processed to separate the cellulose pulp from the lignin. The lignins employed in the process of this invention may be obtained from the kraft wood-pulping process wherein the natural lignin is present as a sodium salt. In kraft pulping, the wood is subjected to effects of strong alkali. The lignin in this process forms a soluble sodium salt which is separated from the cellulose and dissolves in the pulping liquor. The lignin is recovered from the spent pulping liquor, known as black liquor, by lowering the pH level of the liquor.

Lowering the pH of the black liquor containing the lignin salt generally may be accomplished by the introduction of carbon dioxide or other acidifying compounds. Upon the addition of carbon dioxide to the black liquor, the phenolic hydroxide groups of the lignin molecule, which are in ionized form, are converted into their free phenolic or acidic form. This conversion renders the lignin insoluble in the black liquor, as a result of which it precipitates out.

The alkali lignins are usually recovered from black liquor as water-insoluble products by a precipitation procedure wherein the black liquor, initially having a pH of around 13, is lowered to a pH of about 9.5. To purify the lignin precipitate, it has heretofore been a conventional practice to reduce the pH level of the lignin-containing slurry to a highly acid pH of about 1.5 to 3, at which point it is filtered and washed with water to remove inorganic salts and other impurities therefrom.

Attempts to employ lignin by-products recovered from kraft pulping liquors in the foregoing manner as an adhesive binder and grinding aid in water-based carbon black printing compositions have met with certain problems. To dissolve the lignin in the water-based composition, it has been proposed to render the lignin water-soluble by addition of an amine compound to form a water-soluble amine salt of the lignin. Examples of such organic amine compounds are: mono-, di- or triethanolamine; mono-- di-, or trimethyl (ethyl) amine; and mono-, di-, and tripentylamine. However, a large number of lignin insolubles remain in the aqueous lignin amine composition, causing unacceptable sludging and highly variable viscosities in the printing compositions. A consistent and stable viscosity is necessary for use of the lignin as an additive in a water-based carbon black composition.

By means of the present invention, it has been found that lignin by-products of the black liquor of a kraft pulping process may be produced with greatly improved solubility and stability in aqueous solution with an organic amine, and with greatly decreased sludging of the lignin in the aqueous printing composition. More specifically, it has been found that lignins recovered from the kraft black liquor, which are prepared and maintained without subjecting them to highly acidic pH levels at or below about pH 5, are readily water-soluble and stable in solution when combined with an organic amine in aqueous medium.

The process of the present invention to provide improved water-soluble lignin by-products for use as additives in water-based printing systems involves the steps of: (1) initially precipitating the lignin from the black liquor of a kraft pulping process by lowering the pH level of the black liquor to a pH of about 9.5, (2) further acidifying the precipitated lignin composition, and (3) washing the precipitated lignin product with water to remove inorganic salts and other impurities while avoiding exposure of the lignin to pH levels of about 5 and below. The pH level of the lignin should be maintained higher than about 5 at all times in its recovery, purification, and storage until use in water-solubilized form.

The recovered and purified lignin by-product is rendered water-soluble by addition of an organic amine for subsequent use in a water-based printing composition. Lignins which are recovered, purified, and maintained at pH levels above about 5 exhibit as much as about 95% to 99% water-solubility with monoethanolamine when the amine addition is about 10% by weight of the solid lignin, and as much as about 99% or better when the amine addition is about 13.3% by weight of the solid lignin. In contrast, lignins recovered, purified, and maintained at acidic pH levels below 5, e.g., 1.5 to 3, for an extended time period, e.g., of more than about an hour, are significantly less water-soluble in amine salt form.

To illustrate the benefits of the process of the present invention, lignin by-product samples recovered from the black liquor of a kraft pulping process were acidified to various levels for water-wash purification. The following procedure was employed to determine the lignin insolubles in the samples combined in aqueous medium with monoethanolamine.

Each purified lignin sample was placed in aqueous slurry to obtain a 10% lignin solids concentration. Monoethanolamine was added to the slurry in an amount equal to from about 10% to about 13.3% by weight of the dry lignin solids in the slurry. The liquid composition was heated to 71° C., cooled to 20° to 25° C. and centrifuged at 1300 times gravity for 20 minutes. The supernatant was decanted from the sludge, the sludge dried overnight at 205° F. and weighed.

The results of the water solubility of the lignin amine salts prepared from lignins acidified at various pH levels are illustrated by the curved lines in the accompanying graph of FIG. 1. The solid line represents the solubility of the lignin discharged from the filter at the pH values indicated. The filter is set to produce lignin slurry at the indicated pH values by regulating the acid flow. Before the lignin enters the acidifying zone, its pH is from 9.5 to 10.0. Enough acid is added to produce the pH value desired, such as 5.6, 3.45, 2.6, and 2.28, etc. These samples were analyzed without pH adjustment to produce the data shown by the solid line. At the same time, duplicates of these samples were pH adjusted to from 7.0 to 7.3 by using ammonium hydroxide. These duplicates were also analyzed and the data are portrayed by the broken line curve.

FIG. 2 illustrates, in graph form, the effect of storage time under room temperature conditions at various pH levels, on the solubility of lignin in an aqueous MEA composition consisting of 10 grams lignin and 1 gram of MEA in 89 grams water. As can be seen, lignin/MEA aqueous compositions maintained at pH levels of above about 5 remain about 98% water-soluble for extended periods, while those lignin compositions which are at pH levels of lower than about 5 begin to quickly lose their solubility (more than 10% insolubles) after about one hour.

Finally, the following Table shows the improved solubility of lignin amine salts prepared by monoethanolamine (MEA) addition to lignins slurried at pH values above 5 as compared to salts prepared with lignin slurried at a pH value below 5.

TABLE

| Run No. | Extractor Conditions | | | | | | MEA Added (% of Lignin) | Insoluble Fraction (% of Lignin) (pH Adjusted*) | MEA Added (% of Lignin) | Insoluble Fraction (% of Lignin) (pH Adjusted*) |
|---|---|---|---|---|---|---|---|---|---|---|
| | Feed pH (pH) | Feed Flow (GPM) | Filtration Rate (Secs) | Prewash Flow (GPM) | Final Wash (GPM) | Slurry pH (pH) | | | | |
| 1 | 9.7 | 160 | 11 | None | 50 | 2.4 | 10 | 21.0 | 13.3 | 4.3 |
| 2 | 9.7 | 160 | 11 | None | 50 | 5.4 | 10 | 1.56 | 13.3 | 0.45 |
| 3 | 9.6 | 160 | 11 | 60 | 50 | 6.4 | 10 | 1.07 | 13.3 | 0.50 |
| 4 | 9.5 | 160 | 9 | 60 | 50 | 5.9 | 10 | 0.60 | 13.3 | 0.52 |
| 5 | 9.5 | 160 | 9 | 60 | 50 | 6.1 | 10 | 0.63 | 13.3 | 0.54 |
| 6 | 9.5 | 160 | 11 | 60 | 50 | 6.0 | 10 | 0.83 | 13.3 | 0.53 |
| 7 | 9.5 | 160 | 11 | 60 | 50 | 6.4 | 10 | 0.62 | 13.3 | 0.55 |

*Since maintenance of lignin amine salt pH below 5 deleteriously affects its solubility (i.e., increases the insoluble fraction), determinations of the insoluble fractions in all runs were made subsequent to pH adjustment to 7.0 with ammonium hydroxide.

It can be seen from the data in the table that maintenance of lignin slurry pH during the wash step prior to organic amine addition significantly increases the water solubility of the lignin amine salt product.

From the foregoing description of preferred embodiments and illustrations of the method and products of the present invention, it can be seen that the recovery, purfication, and storage of lignin by-products of the black liquor residue of a kraft pulping process at mildly acidic pH conditions, as opposed to highly acidic conditions as in the prior art, permit the effective use of water-soluble amine salts of such lignins as grinding aids and binders in water-based printing ink compositions without the sludging and viscosity problems heretofore present in compositions of the prior art.

That which is claimed is:

1. An improved method for forming an amine salt of lignin having improved water solubility comprising precipitating lignin from the black liquor residue of a kraft pulping process by acidification and reacting the precipitated lignin with an organic amine wherein the improvement comprises precipitated lignin which has been acidified to a pH of no lower than about 5 for wash-water removal of inorganic salts and other impurities therefrom.

2. The improved method of claim 1 wherein the amine compound is selected from the group consisting of: mono-, di-and triethanolamine; mono-, di- and trimethyl (ethyl) amine; and mono-, di- and tripentylamine.

3. The improved method of claim 2 wherein the organic amine is monoethanolamine.

4. The improved method of claim 2 wherein the monoethanolamine is added in an amount from about 10% to 13% by weight based on the weight of the solid lignin present in the aqueous slurry.

5. The improved method of claim 1 wherein the lignin precipitate is acidified by addition of sulfuric acid to the aqueous slurry.

6. The improved method of claim 1 wherein the black liquor residue is lowered to a pH of about 9.5 by addition of carbon dioxide.

7. The water-soluble amine salt of lignin produced by the method of claim 1.

8. The water-soluble amine salt of lignin produced by the method of claim 3.

9. The water-soluble amine salt of lignin produced by the method of claim 5.

10. The water-soluble amine salt of lignin produced by the method of claim 6.

* * * * *